(12) United States Patent
Genkin et al.

(10) Patent No.: US 7,850,944 B2
(45) Date of Patent: Dec. 14, 2010

(54) STEAM-HYDROCARBON REFORMING METHOD WITH LIMITED STEAM EXPORT

(75) Inventors: Eugene S. Genkin, Allentown, PA (US); Stephen Paul DiMartino, Sr., Schnecksville, PA (US); Miguel Rafael Alvarez, Whitehall, PA (US); David Anthony Zagnoli, Macungie, PA (US); Christopher Francis Harris, Old Zionsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 428 days.

(21) Appl. No.: 12/101,261

(22) Filed: Apr. 11, 2008

(65) Prior Publication Data

US 2009/0232729 A1 Sep. 17, 2009

Related U.S. Application Data

(60) Provisional application No. 61/037,190, filed on Mar. 17, 2008.

(51) Int. Cl.
*C01B 3/24* (2006.01)
*C01B 3/26* (2006.01)
(52) U.S. Cl. .................... 423/650; 423/651
(58) Field of Classification Search .......... 423/650
See application file for complete search history.

(56) References Cited

U.S. PATENT DOCUMENTS

| | | | |
|---|---|---|---|
| 3,622,267 A | 11/1971 | Bartholome et al. | |
| 4,553,981 A | 11/1985 | Fuderer | |
| 4,869,894 A * | 9/1989 | Wang et al. | 423/650 |
| 5,264,202 A | 11/1993 | Snyder | |
| 6,818,028 B2 | 11/2004 | Barnett et al. | |
| 6,981,994 B2 | 1/2006 | Drnevich et al. | |
| 7,148,261 B2 | 12/2006 | Hershkowitz et al. | |
| 7,220,505 B2 * | 5/2007 | Malhotra et al. | 429/411 |
| 7,297,169 B2 * | 11/2007 | Pham et al. | 48/198.7 |
| 2003/0110693 A1 * | 6/2003 | Drnevich et al. | 48/197 R |
| 2003/0110694 A1 | 6/2003 | Drnevich et al. | |
| 2006/0242902 A1 * | 11/2006 | Tautz | 48/127.9 |
| 2006/0277828 A1 | 12/2006 | Licht | |
| 2007/0051042 A1 | 3/2007 | Grover et al. | |
| 2007/0104641 A1 | 5/2007 | Ahmed et al. | |
| 2007/0130831 A1 | 6/2007 | Vipperla et al. | |
| 2007/0140954 A1 * | 6/2007 | Tio | 423/650 |

FOREIGN PATENT DOCUMENTS

| | | |
|---|---|---|
| EP | 0483795 A1 | 5/1992 |
| EP | 1277697 B1 | 1/2003 |
| WO | 2006009703 A1 | 9/2006 |
| WO | 2007056004 A1 | 5/2007 |

* cited by examiner

*Primary Examiner*—Melvin C Mayes
*Assistant Examiner*—Kenneth Vaden
(74) *Attorney, Agent, or Firm*—Bryan C. Hoke, Jr.

(57) ABSTRACT

A method for generating hydrogen and/or synthesis gas in a production facility where little or no export steam is produced. Most or all of the high pressure steam produced from the waste heat from the process is used in the steam-hydrocarbon reformer with little or no steam export. The method uses oxygen enhanced combustion which may involve oxygen lancing and/or oxygen-enrichment. Plant efficiencies using the method and prior art-type methods are compared.

22 Claims, 6 Drawing Sheets

STEAM-HYDROCARBON REFORMING METHOD WITH LIMITED STEAM EXPORT

CROSS-REFERENCE TO RELATED APPLICATIONS

This patent application claims priority to provisional application U.S. Ser. No. 61/037,190 filed on Mar. 17, 2008, the contents of which are hereby incorporated by reference.

BACKGROUND

The present invention relates to a method for generating hydrogen and/or synthesis gas by steam-hydrocarbon reforming along with generating steam using waste heat from the steam-hydrocarbon reforming process. More particularly, the present invention relates to such a process using oxygen-enhanced combustion in the reformer with little or no steam export.

Synthesis gas is used to produce products such as ammonia, methanol and hydrogen. Synthesis gas is generated by high temperature processes where a lot of waste heat is available. The waste heat is generally used to generate steam and helps to improve the overall efficiency of the synthesis gas facility. In typical facilities, the amount of steam generated from the waste heat significantly exceeds the amount of steam needed for reforming of a hydrocarbon feed in a steam-hydrocarbon reformer. The excess steam is exported or used to generate power in a steam turbine.

However, exporting steam requires expensive pipeline systems including control and safety valves, steam traps, heat tracing, etc. Exporting steam is justified when steam is needed nearby and/or a customer is willing to pay a reasonable price for the steam. Exporting steam can also impose constraints on plant location in order to minimize the length of the steam export piping.

Facilities for producing synthesis gas generate large amounts of steam from the waste heat. Depending on the design, overall steam production may be 35% to 300% more than required for internal use in the steam-hydrocarbon reformer. Current industry practice is to export the excess steam or to use the steam in a steam turbine for power production. Both options require additional capital expenditure and can be cost prohibitive for projects where there is no customer willing to buy the steam at a reasonable cost, or power can not be produced competitively.

For small hydrogen production units where steam export is not justified, a portion of the excess steam is often used in the process less efficiently or vented. The hydrogen plant may be designed with less heat recovery equipment resulting in a less efficient plant.

There are a number of design options that have been used to vary the total steam production from the synthesis gas plant and reduce steam export. These design options take into account process limitations such as supplemental fuel requirements for the catalytic steam reformer.

One widely used option is to preheat the combustion air for use in the reformer to high temperature, for example up to 600° C. (1100° F.). Combustion air is typically preheated in the convection section of the reformer and can be arranged using one or two stages depending on the desired preheat temperature. Preheating the combustion air helps to reduce the amount of fuel required for combustion in the reformer. Since less fuel is used, the flow of flue gases from the reformer is reduced resulting in less waste heat for generating steam.

Fuel preheating has a similar but smaller impact on overall steam production.

Another option is to use an adiabatic performer. An adiabatic performer is a vessel filled with Nickel-based reforming catalyst that is located upstream of the primary reformer. A mixed feed of steam and a hydrocarbon are fed to the adiabatic performer at a high temperature. The performed product is heated again by the combustion product gases and then fed to the primary reformer.

Use of a performer allows the recovery of additional heat from the flue gas back to the process by heating the performer effluent stream, thus reducing the amount of heat available for steam generation. Use of a performer has other benefits such as removing higher hydrocarbons from the feed stream to the primary reformer.

Facilities including a performer are typically cost effective since the size of the primary reformer may be reduced while maintaining high efficiency.

These methods to reduce the amount of steam are useful for cases where export steam has little or no value. However, the use of air preheat and/or a performer still has significant waste heat and can not provide suitable efficiencies without taking credit for steam export.

When credit for the steam produced can not be reasonably factored in to the efficiency of the synthesis gas generating facility, methods are required to lessen the impact on plant efficiency.

There is a need to lessen the impact on plant efficiency when little or no export steam is needed or produced. It would be desirable to produce hydrogen in a reforming process while producing little or no export steam and while maintaining overall plant efficiency.

BRIEF SUMMARY

The present invention relates to a method for generating hydrogen in a production facility. The method comprises forming a reformer feed gas mixture stream from a feed steam stream and a reformer feedstock stream comprising a hydrocarbon wherein the feed steam stream has a first steam mass flow rate, $R_1$; introducing the reformer feed gas mixture stream into a plurality of catalyst-containing reformer tubes of a catalytic steam reformer and reacting the hydrocarbon with the steam in a reforming reaction under reaction conditions effective to form a reformed gas mixture comprising hydrogen; introducing a fuel into a combustion section of the reformer; introducing oxygen and nitrogen into the combustion section of the reformer at an $O_2$ to $N_2$ molar ratio of 0.35 to 2.3 or 0.6 to 0.8; combusting the fuel with the oxygen in the combustion section under conditions effective to combust the fuel to form a combustion product gas mixture and generate heat to supply energy for the reforming reaction; withdrawing the combustion product gas mixture from the combustion section of the reformer; withdrawing the reformed gas mixture from the plurality of catalyst-containing reformer tubes; and generating an intermediate gas stream comprising steam from a liquid water-containing stream via indirect heat exchange between the liquid water-containing stream and at least one of a stream formed from the reformed gas mixture and a stream formed from the combustion product gas mixture, wherein the intermediate gas stream comprises steam having a pressure of 2 MPa to 12 MPa or 2 MPa to 5 MPa and has a second steam mass flow rate, $R_2$, wherein $$0.9 \le \frac{R_2}{R_1} \le 1.2 \text{ or } 0.9 \le \frac{R_2}{R_1} \le 1.1.$$

90% to 100% of the second steam mass flow rate, $R_2$, may be generated via indirect heat exchange between the liquid water-containing stream and the stream formed from the reformed gas mixture.

0 to 10% of the second steam mass flow rate, $R_2$, may be generated via indirect heat exchange between the liquid water-containing stream and the stream formed from the combustion product gas mixture.

$R_2$ may equal $R_1$ and 100% of the second steam mass flow rate, $R_2$, may be generated via indirect heat exchange between the liquid water-containing stream and the stream containing the reformed gas mixture, and 0% of the second steam mass flow rate, $R_2$, may be generated via indirect heat exchange between the liquid water-containing stream and the stream containing the combustion product gases.

The method may further comprise replenishing the feed steam stream from a stream formed from at least a portion of the intermediate gas stream comprising steam.

The fuel may have a hydrogen concentration of 0 to 40 mole % or 0 to 20 mole %.

The oxygen and nitrogen may be introduced together as an oxygen-enriched oxidant mixture.

A first portion of the oxygen introduced into the combustion section may be introduced as a first oxidant mixture having a concentration of 20 mole % to 26 mole % oxygen and a second portion of the oxygen introduced into the combustion section may be introduced as a second oxidant mixture having a concentration of 26 mole % to 100 mole % oxygen. The first portion may be air having a concentration of 21 mole % oxygen.

The method may further comprise superheating at least a portion of the intermediate gas stream via indirect heat exchange between the intermediate gas stream and at least a portion of the stream formed from the reformed gas mixture or another stream formed from the reformed gas mixture thereby forming a superheated intermediate gas stream, and replenishing the feed steam stream from a stream formed from at least a portion of the superheated intermediate gas stream. The superheated intermediate gas stream may be superheated by 40° C. to 175° C.

The method may further comprise superheating at least a portion of the intermediate gas stream via indirect heat exchange between the intermediate gas stream and at least a portion of the stream formed from the combustion product gas mixture or another stream formed from the combustion product gas mixture thereby forming a superheated intermediate gas stream, and replenishing the feed steam stream from at least a portion of the superheated intermediate gas stream. The superheated intermediate gas stream may be superheated by 40° C. to 175° C.

The method may further comprise introducing at least a portion of the stream formed from the reformed gas mixture with a temperature of 800° C. to 930° C. into a shift reactor containing copper oxide-based catalyst.

The method may further comprise superheating the intermediate gas stream via indirect heat exchange between the intermediate gas stream and at least a portion of the stream formed from the reformed gas mixture or another stream formed from the reformed gas mixture thereby forming a superheated intermediate gas stream, passing at least a portion of the superheated intermediate gas stream through a steam turbine to generate power and thereby forming a steam turbine effluent from the superheated intermediate gas stream, and replenishing the feed steam stream from at least a portion of the steam turbine effluent. The method may further comprise using the power generated by the steam turbine for oxygen generation.

The method may further comprise superheating the intermediate gas stream via indirect heat exchange between the intermediate gas stream and at least a portion of the stream formed from the reformed gas mixture or another stream formed from the reformed gas mixture thereby forming a superheated intermediate gas stream, passing at least a portion of the superheated intermediate gas stream through a steam turbine to generate shaft work and thereby forming a steam turbine effluent from the superheated intermediate gas stream, and replenishing the feed steam stream from at least a portion of the steam turbine effluent. The method may further comprise using the shaft work for oxygen generation.

DETAILED DESCRIPTION

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

For the purposes of simplicity and clarity, detailed descriptions of well-known devices, circuits, and methods are omitted so as not to obscure the description of the present invention with unnecessary detail.

The phrase "at least a portion" means "a portion or all."

Figure 1:
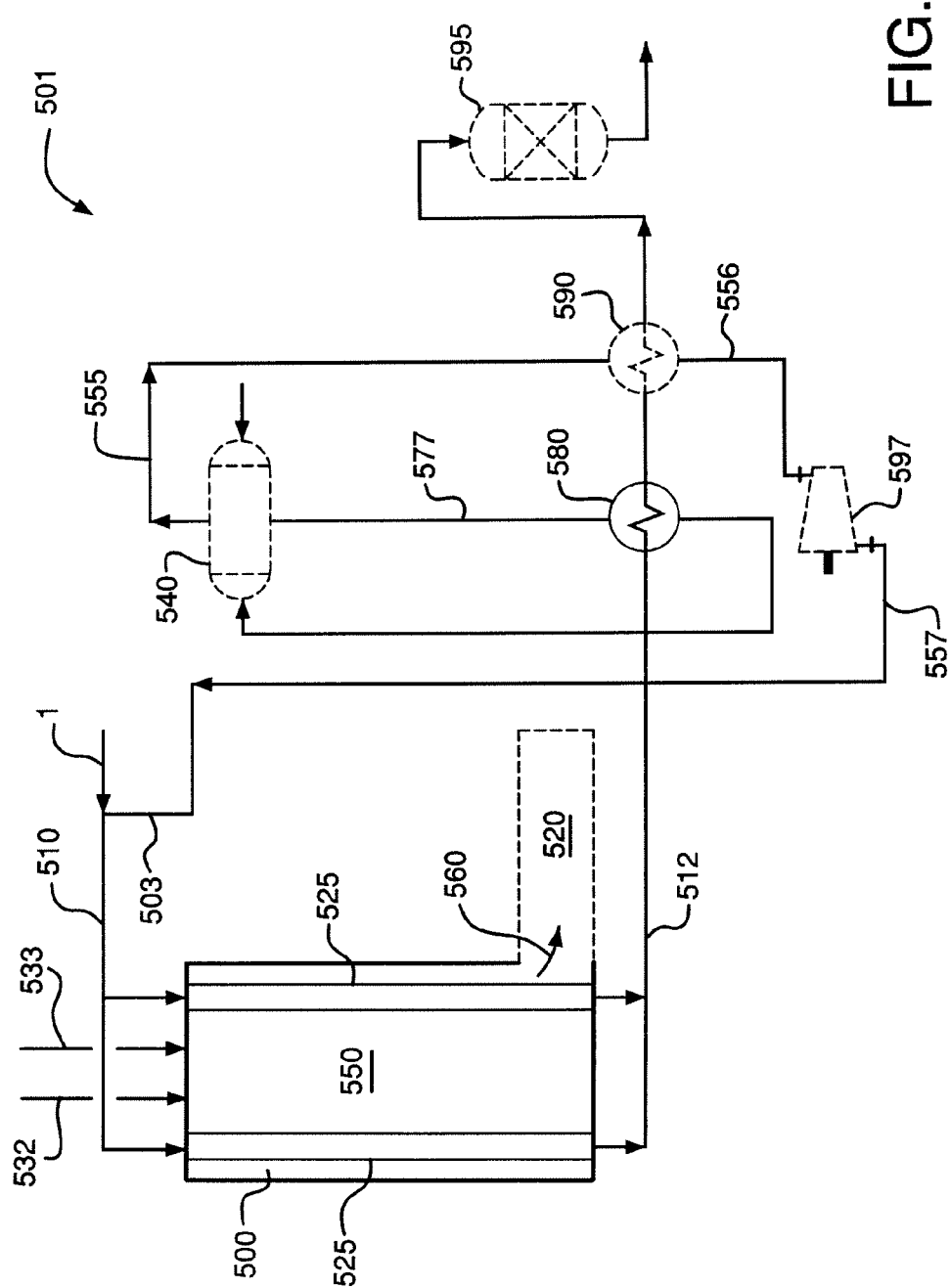
FIG. 1 is a process flow diagram of a production facility for generating hydrogen according to the present method.

The present invention relates to a method for generating hydrogen in a production facility. The method will be described with reference to FIG. 1 showing a process flow diagram of a production facility 501. The method utilizes catalytic steam reforming. Catalytic steam reforming, also called steam methane reforming (SMR) or steam reforming, is defined as any process used to convert reformer feedstock to synthesis gas by reaction with steam over a catalyst. Synthesis gas, commonly called syngas, is any mixture comprising hydrogen and carbon monoxide. The reforming reaction is an endothermic reaction and may be described generally as $C_nH_m + n\ H_2O \rightarrow n\ CO + (m/2+n)H_2$. Hydrogen is generated when synthesis gas is generated.

A production facility for generating hydrogen and/or synthesis gas is a reformer and associated equipment for the production of hydrogen and/or synthesis gas. Associated equipment may include adiabatic prereformers, heat exchangers, pumps, fans, water-gas shift reactors, pressure swing adsorbers, condensers, boilers, steam drums, desulphurizers, deaerators, headers, manifolds, piping, etc.

Catalytic steam reforming takes place in a catalytic steam reformer 500. A catalytic steam reformer, also called a steam methane reformer, is defined herein as any fired furnace used to convert reformer feedstock containing elemental hydrogen and carbon to synthesis gas by a reaction with steam over a catalyst with heat provided by combustion of a fuel. Feedstock may be natural gas, methane, naphtha, propane, refinery fuel gas, refinery offgas, or other suitable reformer feedstock known in the art. Suitable operating temperatures range from 350° C. to 650° C. at the inlet and 750° C. to 950° C. at the outlet. Suitable pressures range from 1 to 50 atm. Preferred operating conditions for a catalytic steam reformer are known in the art.

The method comprises forming a reformer feed gas mixture stream 510 from a feed steam stream 503 and a reformer feedstock stream 1. The reformer feedstock stream comprises a hydrocarbon.

A feed steam stream is any stream comprising 90 to 100 mass % steam or 99 to 100 mass % steam that is used to form a reformer feed gas mixture stream. Generally a feed steam stream will be steam containing only minor amounts of other components or impurities. The feed steam stream has a first steam mass flow rate, $R_1$. The first steam mass flow rate, $R_1$, is the mass flow rate of the steam component in the feed steam stream. In case the steam concentration is 95 mass %, the first steam mass flow rate is 95% multiplied by the total mass flow rate of the stream. Since the indefinite articles "a" and "an" as used herein mean one or more when applied to any feature in the specification and the claims, one or more feed steam streams may be used to form the reformer feed gas mixture. The first steam mass flow rate, $R_1$, then represents the totalized steam mass flow rate for the one or more feed steam streams.

A reformer feedstock stream is any stream comprising a hydrocarbon suitable for use in a reforming reaction to form hydrogen. The hydrocarbon may be any C1 to C5 alkane or alkene or any other hydrocarbon known and used for steam-hydrocarbon reforming. A reformer feedstock stream may be, for example, a natural gas stream, or a purified methane stream. Other reformer feedstock may include any hydrocarbon containing stream such as propane, vaporized butane, vaporized naphtha, or refinery fuel gas (RFG). Since the indefinite articles "a" and "an" as used herein mean one or more when applied to any feature in the specification and claims, one or more reformer feedstock streams comprising a hydrocarbon may be used to form the reformer feed gas mixture. Also the reformer feedstock stream may comprise one or more hydrocarbons.

A reformer feed gas mixture stream is any stream containing a gas mixture comprising steam and at least one hydrocarbon suitable for introducing into a reformer to generate hydrogen. The reformer feed gas mixture is generally referred to as "mixed feed." The reformer feed gas mixture stream may be formed by mixing the reformer feedstock stream and the feed steam stream. The reformer feed gas mixture stream may be formed by mixing a feed steam stream and a reformer feedstock stream and passing the mixture through an adiabatic performer (not shown). The reformer feedstock stream may have a steam-to-carbon ratio of 1.5 to 5 on a molar basis. The reformer feedstock stream may have a steam-to-carbon ratio of 2 to 4 on a molar basis.

The performer may be an adiabatic performer or a convective performer. Prereformers are well-known in the art. A performer is defined herein as any unfired vessel used to convert feedstock containing elemental hydrogen and elemental carbon to synthesis gas by reaction with steam over a catalyst with or without heating. A performer may be an adiabatic fixed bed reactor. A performer may be a tubular reactor. A performer generally employs a different type of catalyst than a primary reformer, for example a high activity, high nickel content catalyst. Temperatures in a performer may be in the range of about 800° F. (400° C.) to about 1100° F. (600° C.). Heat to a performer may be provided from combustion product (exhaust) gases from a reformer or other source, but is characterized by the lack of direct radiation heating by a combustion flame. A performer and a reformer may be physically connected. The $H_2$ concentration in a performer effluent is typically less than 20 mole % $H_2$, whereas the $H_2$ concentration in a reformer effluent is typically greater than 45 mole % $H_2$. The $CH_4$ concentration in a performer effluent is typically about 25 mole % $CH_4$, whereas the $CH_4$ concentration in a reformer effluent is typically less than about 6 mole % $CH_4$.

Forming may be a single step or may include a combination of various steps, for example, mixing, reacting, heating, cooling, compressing, expanding, throttling, separating, etc. A mixture is formed from a first gas and a second gas if the mixture comprises one or more elemental constituents from the first gas and one or more elemental constituents from the second gas. For example, a mixture comprising elemental carbon and/or elemental hydrogen from a methane-containing first gas and elemental hydrogen and/or elemental oxygen from a water-containing second gas is formed from the methane-containing first gas and the water-containing second gas. The mixture may comprise the element carbon and element hydrogen as methane from the methane-containing first gas and the element hydrogen and the element oxygen as water from the water-containing second gas. Or the methane-containing first gas and the water-containing second gas may be reacted so that the mixture comprises the element carbon from the methane-containing first gas and element oxygen from the water-containing second gas as carbon dioxide.

A first mixture is formed from a second mixture if the first mixture comprises one or more elemental constituents from the second mixture. For example, a first mixture comprising elemental carbon, elemental hydrogen, and elemental oxygen as carbon dioxide and hydrogen may be formed via a shift reaction of a second mixture comprising elemental carbon, elemental hydrogen and elemental oxygen as carbon monoxide and water. Also a first mixture is formed from a second mixture if the first mixture comprises the second mixture and therefore having compositions that are the same.

A first mixture is formed from a second mixture if the first mixture comprises at least a portion of the second mixture.

The method comprises introducing the reformer feed gas mixture stream 510 into a plurality of catalyst-containing reformer tubes 525 of a catalytic steam reformer and reacting the hydrocarbon with the steam in a reforming reaction under reaction conditions effective to form a reformed gas mixture 512 comprising hydrogen. The reformer feed gas mixture may be distributed to the plurality of catalyst-containing reformer tubes through a header.

The reaction to convert feedstock with steam over a catalyst takes place in the reaction section of the reformer which is inside of catalyst-containing reformer tubes 525. A catalytic steam reformer may have a plurality of catalyst-containing reformer tubes through which the reformer feed gas mixture is passed to form a reformed gas mixture comprising hydrogen. As used herein, plurality means three or more. A catalytic steam reformer may have up to about 1100 catalyst-containing reformer tubes. Catalyst-containing reformer tubes are reactors, generally tubular in shape, that have been loaded with catalyst in the form of pellets, structured packing, or other catalyst-containing packing known in the art. The cross-section of the tubes may be circular or other desired shape. Suitable catalysts for reforming reformer feedstock are known in the art. Suitable materials for making reformer tubes are known in the art.

Reaction conditions effective to form a reformed gas mixture include a temperature in the range of 500° C. to 1200° C. and a pressure in the range of 1 to 50 atm. Preferred reaction conditions are known in the art.

A reformed gas mixture is any gas mixture that has been formed by the reforming reaction. The reformed gas mixture produced in the catalyst-containing reformer tubes generally comprises $H_2$, CO, $CO_2$, and $H_2O$. The reformed gas mixture may also comprise $CH_4$ from the feed that failed to react in the catalyst-containing reformer tubes. The concentration of $H_2$ in the reformed gas mixture is generally in the range of 40 mole % to 55 mole %. The concentration of CO is generally in the range of 7 mole % to 18 mole %.

The method comprises introducing a fuel 532 into a combustion section 550 of the reformer 500.

Fuel introduced into the combustion section of the reformer may be any fuel suitable for providing heat by combustion in the reformer. The fuel may include pressure swing adsorber residual gas, refinery fuel gas, refinery off-gas, natural gas, purified methane, propane and the like. Pressure swing adsorber residual gas typically has a low concentration of $H_2$. Consequently, the fuel may have a $H_2$ concentration of 0 to less than 50 mole % $H_2$ or 0 to 20 mole % $H_2$. Pressure swing adsorber residual gas is any effluent stream from a pressure swing adsorber excluding the hydrogen product stream. Since the indefinite articles "a" and "an" as used herein mean one or more when applied to any feature in the specification and the claims, one or more fuels may be introduced into the combustion section of the reformer. It is often the case that multiple fuels are used. A pressure swing adsorber residual gas may be the primary fuel and a supplemental fuel, such as natural gas, added as needed to boost the combustion energy provided for the reforming reaction. The added supplemental fuel is sometimes referred to as "trim fuel." The $H_2$ concentration of the fuel is based on the resultant combined streams of supplemental fuel and pressure swing adsorber residual gas.

The combustion section of the reformer is the section wherein combustion occurs. Generally a flame is visible, however flameless combustion may also be used.

The method comprises introducing oxygen and nitrogen 533 into the combustion section 550 of the reformer at an $O_2$ to $N_2$ molar ratio of 0.35 to 2.3. Oxygen and nitrogen may be introduced into the combustion section of the reformer at an $O_2$ to $N_2$ molar ratio of 0.6 to 0.8.

Oxygen-enhanced combustion is used in the method. The effective oxygen concentration is greater than the oxygen concentration in air. Air has an oxygen concentration of approximately 21 mole % and a nitrogen concentration of approximately 79 mole %. Correspondingly the $O_2$ to $N_2$ molar ratio for air is about 0.266. According to the method, the effective concentration is in the range of 26 mole % to 70 mole % oxygen. Correspondingly, the $O_2$ to $N_2$ molar ratio is in the range of 0.35 to 2.3.

Oxygen may be introduced into the combustion section of the reformer as air with oxygen lancing and/or as oxygen-enriched air. With oxygen-enriched air, oxygen is blended with air prior to introducing the oxidant mixture into the combustion section; then oxygen and nitrogen are introduced together as an oxygen-enriched oxidant mixture having an oxygen concentration of 26 to 70 mole % oxygen. With oxygen lancing, one or more streams of air are introduced into the combustion section along with one or more separate streams of an oxidant mixture having a concentration of 40 to 100 mole % oxygen.

Oxygen may be introduced into the combustion section of the reformer via a first oxidant stream having a concentration of 21 to 30 mole % oxygen and a second oxidant stream having a concentration of 30 to 100 mole % oxygen. Oxidant streams of any combination of oxygen concentrations may be used to provide an $O_2$ to $N_2$ molar ratio in the range of 0.35 to 2.3.

The concentration of the industrial grade oxygen depends on the oxygen source. For example, oxygen generated cryogenically may be greater than 99.9 mole % $O_2$, while oxygen generated by adsorption may be 85 to 95 mole % $O_2$. The concentration of the lancing oxygen is not so important. The important feature is that the combined air streams and the lancing streams provides an $O_2$ to $N_2$ molar ratio in the range of 0.35 to 2.3.

The $O_2$ to $N_2$ molar ratio is the sum of the molar flows of oxygen divided by the sum of the molar flows of nitrogen, or mathematically $$\frac{\sum_{i=1}^{n}(F_{O_2})_i}{\sum_{i=1}^{n}(F_{N_2})_i},$$

where $(F_{O_2})_i$ is the molar flow rate of oxygen in stream i, $(F_{N_2})_i$ is the molar flow rate of nitrogen in stream i, and n is the total number of streams that introduce oxygen and/or nitrogen into the combustion section. For example, if air is introduced with a total molar flow rate of 1000 moles/h and pure oxygen is introduced through a lance with a total molar flow rate of 150 moles/h, the $O_2$ to $N_2$ molar ratio is $$\frac{1000 \times 0.21 + 150}{1000 \times 0.79} = 0.46.$$

At least a portion of the fuel may be premixed with oxidant prior to introducing the fuel into the combustion section. At least a portion of the fuel may be introduced through fuel lances. To ensure substantially complete combustion of the fuel, a molar ratio of oxygen to fuel is generally provided with a stoichiometry so as to provide about 5 to 10 mole % excess oxygen. Consequently oxygen is present in the combustion product gas mixture.

Fuel and oxidant may be introduced through burners. Burners for use with reformers are available commercially. These burners may be modified for the higher oxygen concentrations. While the use of oxygen-enhanced combustion is not generally used in the reformer art, suitable materials of construction for burners using higher oxygen concentrations are known. Industrial gas companies have a well-established history of supplying burners suitable for using industrial oxygen. The glass industry for example, uses oxy-fuel burners where the oxygen concentration is 85 mole % to 100 mole % oxygen.

By using oxygen enhanced combustion instead of air, on a relative basis, more energy goes into the reformer tubes instead of being wasted heating up $N_2$. Therefore, the process uses less energy for a given production rate due to the higher available heat from a given amount of fuel. Since the thermal efficiency is higher, less fuel needs to be used for the case of oxygen enhanced combustion compared to air for the same synthesis gas production rate.

While using oxygen enhanced combustion may increase the flame temperature in a reformer, the reformer size and design for a new reformer using the method may be accomplished by one skilled in the art of designing reformers to accommodate the higher flame temperatures produced by the use of oxygen enhanced combustion.

This may be contrasted to U.S. Pat. No. 6,981,994 where the objective is to increase the overall synthesis gas production capacity of an existing system (i.e. retrofit) with a corresponding increase in reactor temperature. In reformers suitable for the method of U.S. Pat. No. 6,981,994, the temperature of the reformer tubes near the burner end of the reformer is colder than the remaining portion of the reformer tubes. In U.S. Pat. No. 6,981,994, oxygen enhanced combustion and additional fuel is used to increase the temperature of the reformer tubes near the burner end to increase the production of syngas and/or hydrogen. The use of increased fuel and oxidant increases the combustion product gases and therefore increases the amount of waste heat. This has the effect of increasing the steam generation and the steam export.

The method comprises combusting the fuel with the oxygen in the combustion section 550 under conditions effective to combust the fuel to form a combustion product gas mixture 560 and generate heat to supply energy for the reforming reaction.

Conditions effective to combust the fuel to form a combustion product gas mixture include a furnace temperature in the range of 700° C. to 2500° C. and a pressure in the range of 0.9 to 1.1 atm. At an oxygen concentration of about 26 mole %, the ignition temperature of $CH_4$ is about 700° C. At an oxygen concentration of about 70 mole %, the adiabatic flame temperature for $CH_4$ is about 2650° C. The furnace temperature is a furnace gas temperature in the combustion section of the reformer outside of the flame envelope and may be determined by a suction pyrometer. Suitable conditions include a furnace temperature in the range of 1500° C. to 2500° C. or 1700° C. to 2300° C. and a pressure in the range of 0.9 to 1.1 atm. Preferred combustion conditions in reformers are known in the art.

When the fuel and oxygen are combusted, heat is generated and a combustion product gas mixture 560 is formed. Heat is transferred to the plurality of catalyst-containing reformer tubes 525 thereby supplying energy for the endothermic reforming reaction. The combustion product gas mixture is any gas mixture resulting from at least partial combustion of the fuel and the oxygen and comprises $CO_2$ and $H_2O$. The combustion product gas mixture may comprise $H_2O$, $CO_2$, $N_2$, $O_2$, and generally lesser amounts of CO and unburned hydrocarbons. Since the oxidant gas used for combustion is not pure oxygen, the combustion product gas mixture will also comprise $N_2$. However, the $N_2$ concentration will be less than the $N_2$ concentration had only air been used without oxygen lancing or oxygen enrichment.

The combustion product gas mixture may also comprise NOx and/or other pollutant gases. NOx reduction techniques known in the art of industrial combustion may be used, for example flue gas recirculation, fuel staging, oxygen staging, selective catalytic or non-catalytic reduction with ammonia, etc.

The method comprises withdrawing the combustion product gas mixture 560 from the combustion section 550 of the reformer. The combustion product gas mixture may be passed to a convection section 520 of the reformer where heat may be transferred from the combustion product gas mixture to other streams thereby increasing the efficiency of the overall process.

The method comprises withdrawing the reformed gas mixture 512 from the plurality of catalyst-containing reformer tubes 525. The reformed gas mixture may be collected from the plurality of catalyst-containing tubes in a header. The reformed gas mixture typically exits the catalyst-containing reformer tubes at 800° C. (1472° F.) to 950° C. (1742° F.).

The method comprises generating an intermediate gas stream 555 comprising steam from a liquid water-containing stream 577 via indirect heat exchange between the liquid water-containing stream 577 and at least one of a stream formed from the reformed gas mixture 512 and a stream formed from the combustion product gas mixture 560. FIG. 1 shows heat exchange between liquid water-containing stream 577 and reformed gas mixture 512 in heat exchanger 580. The steam generation rate in heat exchanger 580 may be modified by use of a bypass (not shown). Although not shown in FIG. 1, alternatively or additionally, heat exchange between a liquid water-containing stream and combustion product gas mixture 560 may be performed in the convection section 520 of the reformer. The intermediate gas stream 555 comprising steam has a pressure of 2 MPa to 12 MPa and a second steam mass flow rate, $R_2$. The ratio of the second steam mass flow rate, $R_2$, to the first steam mass flow rate, $R_1$, is 0.9 to 1.2. The ratio of the second steam mass flow rate, $R_2$, to the first steam mass flow rate, $R_1$, may be 0.9 to 1.1.

The intermediate gas stream comprising steam may have a pressure of 2 MPa to 5 MPa. When steam is generated for export, the pressure requirement is typically greater than that required for forming the mixed feed. An advantage of the present method is that lower pressure steam, i.e. steam suitable for use in the reformer but maybe not suitable for steam export, may be generated.

An intermediate gas stream comprising steam is any stream comprising 90 to 100 mass % steam or 99 to 100 mass % steam produced via indirect heat exchange between a liquid water-containing stream and at least one of a stream formed from the reformed gas mixture and a stream formed from the combustion product gas mixture. Generally an intermediate gas stream comprising steam will be steam containing only minor amounts of other components or impurities. Since the indefinite articles "a" and "an" as used herein mean one or more when applied to any feature in the claims, one or more intermediate gas stream comprising steam may be generated via indirect heat exchange between one or more liquid water-containing streams and one or more streams formed from the reformed gas mixture or the combustion product gases. The second steam mass flow rate, $R_2$, then represents the totalized steam mass flow rate of the one or more intermediate gas streams comprising steam, each having a pressure of 2 MPa to 12 MPa or 2 MPa to 5 MPa.

As shown in FIG. 1, separation of gaseous steam from liquid water may be aided by use of optional steam drum 540.

In the method, 90% to 100% of the second steam mass flow rate, $R_2$, may be generated via indirect heat exchange between the liquid water-containing stream and the stream formed from the reformed gas mixture.

In the method, 0 to 10% of the second steam mass flow rate, $R_2$, may be generated via indirect heat exchange between the liquid water-containing stream and the stream formed from the combustion product gases.

The inventors have discovered that it is advantageous to generate most or all of the steam at the second steam mass flow rate, $R_2$, using heat from the reformed gas mixture. The combustion product gases leaving the reformer have a higher temperature than the reformed gas mixture leaving the reformer. Consequently, it is desirable to heat the performer feed gas and/or reformer feed gas mixture via indirect heat exchange with the combustion product gases. For the case of the performer, it is desirable to introduce the performer feed gas at a suitable temperature for prereforming. For the case of the reformer, it is desirable to introduce the reformer feed gas mixture at a suitable temperature so that the reformer can be used as a reactor and not as a heat exchanger. This is best accomplished by heat exchange with the combustion product gases. The inventors have discovered that after heating the performer feed and/or the reformer feed gas mixture, there may not be sufficient heat available in the combustion product gases to generate the steam needed for the reformer. The reformed gas mixture stream 512 has sufficient heat available for generating steam and preheating boiler feed water. By generating steam via indirect heat exchange with the reformed gas mixture stream, the inventors have discovered that complete elimination of steam generation in the convection section of the reformer is possible, resulting in a reduction of costly equipment in the convection section. The inventors have also discovered that for $$0.9 \le \frac{R_2}{R_1} \le 1.2,$$

a lower gross specific energy may be obtained by generating most or all of the steam by indirect heat exchange with the reformed gas mixture stream as compared to generating steam by indirect heat exchange with the combustion product gases.

In case multiple streams are used to form the intermediate gas stream, the percentage of the second steam mass flow rate, $R_2$, attributed to indirect heat exchange between the liquid water-containing stream and the stream formed from the reformed gas mixture may be determined by an energy balance. The total energy, $Q_T$, to produce the second steam mass flow rate may be found by determining the heat extracted from each of streams used to produce the second steam mass flow rate. The heat extracted is a function of the composition, mass flow rate and temperature change. The percentage of the second steam mass flow rate attributed to indirect heat exchange between the liquid water-containing stream and the stream containing the reformed gas mixture is the ratio of the heat extracted from the stream containing the reformed gas mixture to the total energy extracted expressed as a percentage.

The rate of steam production may be balanced with the rate of steam consumption in the reformer. It may be preferable to integrate steam production and consumption within the production facility 501, however nothing prevents at least partial exchange of steam between the production facility and some other nearby facility. In the method $R_2$ may equal $R_1$ and 100% of the second steam mass flow rate, $R_2$, may be generated via indirect heat exchange between the liquid water-containing stream 577 and the stream formed from the reformed gas mixture 512. Furthermore, 0% of the second steam mass flow rate, $R_2$, may be generated via indirect heat exchange between the liquid water-containing stream 577 and the stream formed from the combustion product gases 560.

In case steam production and consumption is integrated within the production facility, the method may further comprise replenishing the feed steam stream from a stream formed from at least a portion of the intermediate gas stream comprising steam, as shown in FIG. 1. Steam generated within the process using heat from the reformed gas mixture is used to feed the reformer 500 as the feed steam stream 503.

The method may further comprise superheating the intermediate gas stream 555 via indirect heat exchange between the intermediate gas stream and at least a portion of the stream formed from the reformed gas mixture or another stream formed from the reformed gas mixture (not shown) thereby forming a superheated intermediate gas stream 556. One skilled in the art can certainly imagine various ways the reformed gas mixture can be used to generate steam and superheat the steam other than explicitly disclosed herein. The method may further comprise replenishing the feed steam stream from a stream formed from at least a portion of the superheated intermediate gas stream as shown in FIG. 1.

Additionally or alternatively to superheating the intermediate gas stream via heat exchange with the reformed gas mixture, the method may comprise superheating the intermediate gas stream via indirect heat exchange between the intermediate gas stream and at least a portion of the stream formed from the combustion product gas mixture or another stream formed from the combustion product gas mixture thereby forming a superheated intermediate gas stream. One skilled in the art can imagine various ways the reformed gas mixture and the combustion product gas mixture can be used to generate the steam and superheat the steam other than those disclosed explicitly herein. The method may further comprise replenishing the feed steam stream from at least a portion of the superheated intermediate gas stream.

Independent of whether the intermediate gas stream is heated by a stream formed from the reformed gas mixture or a stream formed from the combustion product gas mixture, the superheated intermediate gas stream may be superheated by 40 to 175° C. To superheat is to heat a vapor so as to cause the vapor remain free from suspended liquid droplets. Indicating that a gas stream is superheated by 40° C. means that the difference between the actual temperature and the saturation temperature is 40° C.

The method may further comprise introducing at least a portion of the stream formed from the reformed gas mixture into a shift reactor. Shift reactors, also called water-gas shift reactors, and their operation are well-known in the art. One or more shift reactors may be employed. Shift reactors comprise a vessel containing a catalyst bed through which CO and $H_2O$ flows to form $H_2$ and $CO_2$. The one or more shift reactors may be high temperature, medium temperature, low temperature and/or isothermal shift reactors. High temperature shift reactors may operate at about 350° C. to 450° C. and typically use a non-noble metal catalyst such as mixture of $Fe_3O_4$ and $Cr_2O_3$ (i.e. about 55 wt % Fe and 6% Cr). Low temperature shift reactors may operate at about 200° C. to 260° C. and may use a non-noble catalyst such as Cu—ZnO—$Al_2O_3$, or Cu—ZnO—$Cr_2O_3$. Medium temperature shift reactors operate in the same temperature range as low temperature shift reactors and use a similar catalyst. Low temperature shift reactors are used in combination with high temperature shift reactors, whereas medium temperature shift reactors may be operated without an upstream high temperature shift reactor. Medium temperature shift catalyst is designed to withstand a higher temperature rise through the catalyst bed. Some CO remains after the water-gas shift reaction and there is therefore CO in the effluent of the shift reactor.

The reformed gas mixture may be introduced with a temperature of 185° C. to 230° C. into a shift reactor 595 containing copper oxide-based catalyst. Copper oxide-based shift catalyst is sometimes referred to as low temperature shift catalyst.

At least a portion of the shift reactor effluent may be passed to a pressure swing adsorption system to produce a hydrogen-rich product stream and a pressure swing adsorber residual gas. Pressure swing adsorption is a well-known process used in hydrogen production for purification. The pressure swing adsorber and process can incorporate any desired number of adsorbent beds and any known processing cycles for recovering product hydrogen. Any suitable adsorbent material having desirable selectivity for purposes of the method can be used in the practice of the method. Suitable adsorbents include, for example, zeolitic molecular sieves, activated carbon, silica gel, activated alumina and the like. Zeolitic molecular sieve adsorbents are generally desirable for separation and purification of hydrogen from reformed gas mixtures.

The method may further comprise superheating the intermediate gas stream 555 via indirect heat exchange between the intermediate gas stream and at least a portion of the stream formed from the reformed gas mixture 512 or another stream formed from the reformed gas mixture thereby forming a superheated intermediate gas stream 556 and passing at least a portion of the superheated intermediate gas stream 556 through a steam turbine 597 to generate power and thereby forming a steam turbine effluent 557 from the superheated intermediate gas stream 556. At least a portion of the steam turbine effluent 557 may be used for replenishing the feed steam stream 503.

The power generated by the steam turbine 597 may be used for generating oxygen. The steam turbine may generate electricity and the electricity used to power the oxygen plant. The shaft work from the steam turbine may be integrated with the oxygen plant. For example a compressor/expander or compander may be used for a VSA oxygen plant.

Low grade heat remaining in the reformed gas mixture and combustion product gases may be recovered by generating low pressure steam having a pressure of 130 kPa to 450 kPa. A second intermediate gas stream comprising steam from a second liquid water-containing stream may be generated via indirect heat exchange between the second liquid water-containing stream and a stream formed from the reformed gas mixture and a stream formed from a combustion product gas mixture.

At least a portion of the second intermediate gas stream may be used in a deaerator (shown in examples, below).

At least a portion of the second intermediate gas stream may be used as a heat source in a Rankine cycle heat engine (not shown) to generate power. The heat from the steam may be used to vaporize a working fluid of the Rankine cycle heat engine. The working fluid may be selected from a C3 to C6 hydrocarbon and lithium bromide in water. Rankine cycle heat engines and their operation are well known for power generation.

The present invention will be better understood with reference to the following examples, which are intended to illustrate, but not to limit the scope of the invention. The invention is solely defined by the claims.

EXAMPLES

Example 1

Figure 2:
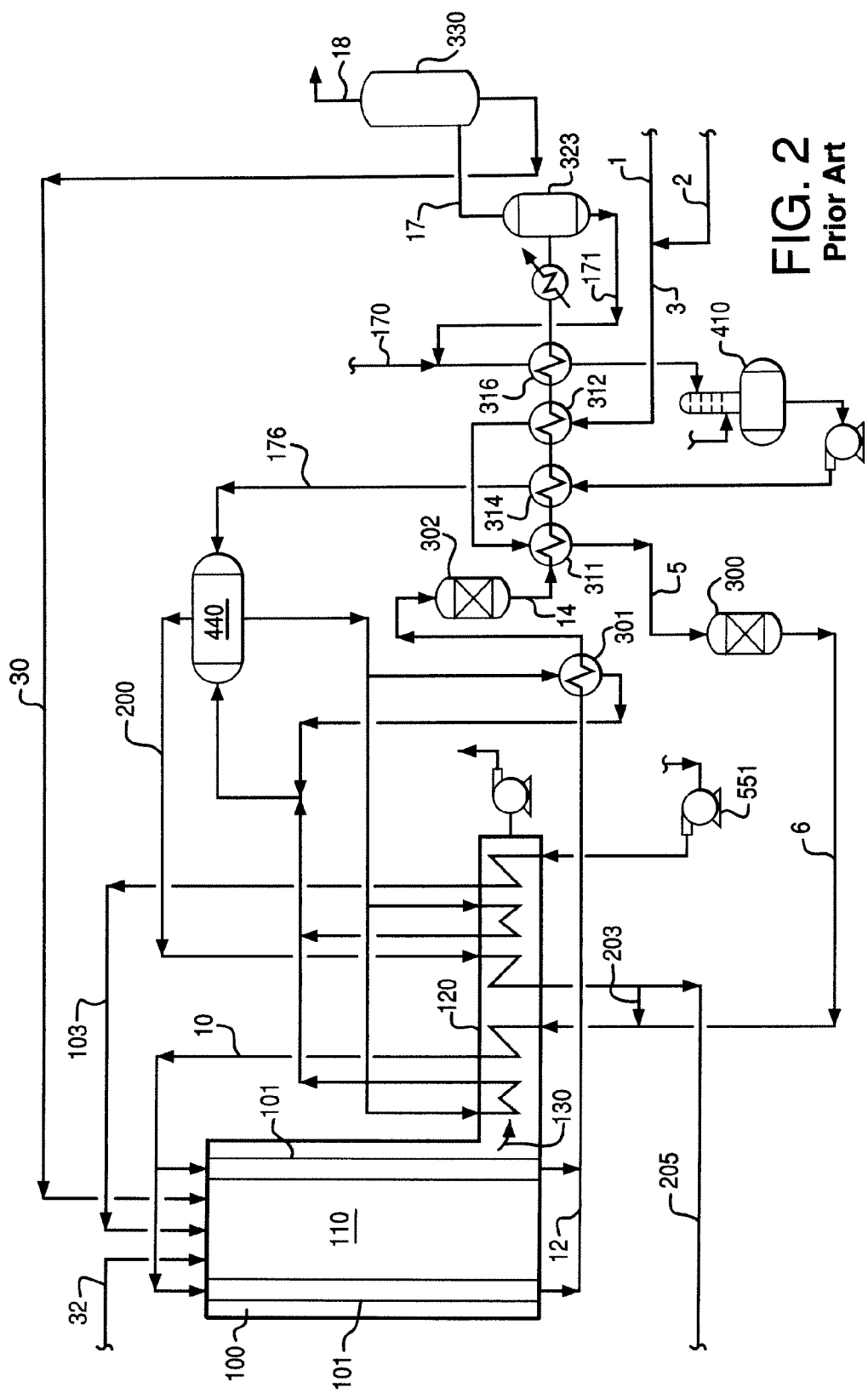
FIG. 2 is a process flow diagram exemplifying a prior art-type production facility for generating hydrogen and generating export steam.

The configuration according to Example 1 is shown in FIG. 2. FIG. 2 is a process flow diagram for a prior art-type hydrogen production facility. A reformer feedstock 1, in this example, natural gas is mixed with a hydrogen recycle stream 2 to form a hydrogen-containing feed stream 3. The hydrogen-containing feed stream 3 is heated via indirect heat exchange with a shift reactor effluent stream 14 from shift reactor 302 in heat exchangers 311 and 312. The shift reactor effluent stream 14 is formed from a reformed gas mixture 12 from the reformer 100 by reaction in shift reactor 302.

The heated hydrogen-containing feed stream 5 is introduced into hydrodesulphurization unit 300 to remove sulfur and form a sulfur-depleted reformer feedstock 6. Sulfur in the reformer feedstock is removed to prevent poisoning of reforming catalyst.

Reformer feed gas mixture stream 10 is formed from feed steam stream 203 and sulfur-depleted reformer feedstock 6 by mixing followed by indirect heat exchange with combustion product gases in the convection section 120 of the reformer 100. The reformer feed gas mixture stream 10 is introduced into a plurality of catalyst-containing reformer tubes 101 of the catalytic steam reformer 100 where hydrocarbons and steam are reacted in a reforming reaction to form synthesis gas. The synthesis gas is withdrawn from the plurality of catalyst-containing reformer tubes 101 as reformed gas mixture 12 comprising hydrogen. The reformed gas mixture may also comprise carbon dioxide, carbon monoxide, water, and methane.

Heat for the reforming reaction is provided by combusting a fuel and air in the combustion section 110 of the reformer 100.

Fuel is provided by pressure swing adsorber (PSA) residual gas 30, which is introduced into the combustion section 110. The PSA residual gas is also called PSA purge gas and contains $H_2$, CO, $CH_4$ and other gases and is therefore suitable as a fuel. Fuel for combustion is also provided by a supplemental fuel 32, which is introduced into the combustion section 110. The supplemental fuel is also called trim fuel and in this example is natural gas.

Air is introduced into the combustion section 110 as preheated combustion air 103. Preheated combustion air 103 is formed using a compressor or blower 551 and a heat exchanger in the convection section 120.

A combustion product gas mixture 130 is withdrawn from the combustion section 110 and used to heat various streams in convection section 120 by indirect heat exchange.

In the process flow diagram in FIG. 2, steam is generated from a variety of heat sources. Make-up water 170 and water 171 from water separator 323 are heated and fed to deaerator 410. Water 176 which has been preheated and deaerated in deaerator 410, is fed into a steam drum 440. The steam drum is typically elevated. Water from the steam drum is directed to heat exchangers in the convection section 120 which provide indirect heat exchange between the water and the combustion product gas mixture 130. Water from the steam drum 440 is also directed to heat exchanger 301 which provides indirect heat exchange between the water and the reformed gas mixture 12. A two-phase mixture of steam and water flow from each of the heat exchangers in the convection section 120 and heat exchanger 301 back to the steam drum. A saturated stream of steam 200 is withdrawn from the steam drum 440 while liquid water is recirculated to the heat exchangers to form more steam. The saturated stream of steam 200 is superheated in another heat exchanger in the convection section 120. The superheated steam is used to replenish the feed steam stream 203 and to form export steam 205.

The reformed gas mixture 12 is passed through high temperature shift reactor 302 to form shift reactor effluent 14. The shift reactor effluent is passed through various heat exchangers 311, 312, 314, 316, water separator 323 and to a pressure swing adsorber system 330. Water is removed as stream 171 and a hydrogen containing stream 17 is passed to the pressure swing adsorber system 330. Pressure swing adsorber system 330 separates the hydrogen from the other components in the shifted reformed gas mixture to form a product hydrogen stream 18 and a PSA residual gas 30.

The process shown in the process flow diagram in FIG. 2 was modeled using commercial process simulator software. Natural gas is used as the reformer feedstock in all of the Examples.

Input parameters and results for this configuration are summarized in Table 1. Input parameters include the steam-to-carbon ratio, S/C, and the effective or overall oxygen to nitrogen molar ratio for oxidants introduced into the combustion section, $O_2/N_2$. The results include the ratio of steam used for reforming to the total steam produced, $S/S_T$, and the normalized net specific energy and the normalized gross specific energy. The total steam produced, $S_T$, is the total steam produced having a pressure greater than 2 MPa. Low grade steam is not included in $S_T$.

The gross specific energy, GSE, is the sum of the Higher Heating Value ($J/Nm^3$) of the supplemental fuel, $HHV_{fuel}$, introduced into the combustion section multiplied by the flow rate of the fuel ($Nm^3/h$), $F_{fuel}$ and the Higher Heating Value ($J/Nm^3$) of the reformer feedstock, $HHV_{feed}$, introduced into the reformer multiplied by the flow rate of the reformer feedstock ($Nm^3/h$), $F_{feed}$, the sum divided by the hydrogen production rate ($Nm3/h$), HPR, expressed in the units $J/Nm^3$; mathematically $$GSE = \frac{HHV_{fuel} * F_{fuel} + HHV_{feed} * F_{feed}}{HPR}.$$

The net specific energy, NSE, is the Higher Heating Value ($J/Nm^3$) of the supplemental fuel, $HHV_{fuel}$, introduced into the combustion section multiplied by the flow rate of the fuel ($Nm^3/h$), $F_{fuel}$, plus the Higher Heating Value ($J/Nm^3$) of the reformer feedstock, $HHV_{feed}$, introduced into the reformer multiplied by the flow rate of the reformer feedstock ($Nm^3/h$), $F_{feed}$, minus the enthalpy difference between the export steam and water at 25° C., $\Delta H$, in J/kg multiplied by the mass flow of the export steam, $F_{steam}$, in kg/h, all divided by the hydrogen production rate ($Nm^3/h$), HPR, expressed in the units $J/Nm^3$; mathematically $$NSE = \frac{HHV_{fuel} * F_{fuel} + HHV_{feed} * F_{feed} - \Delta H * F_{steam}}{HPR}.$$

The gross specific energy is always greater than or equal to the net specific energy since no credit is given for the export steam. The gross and net specific energies are equal when no steam is exported.

All of the specific energy results in Table 1 are normalized with respect to the net specific energy of Example 1.

As shown in Table 1, according to the simulation results, about 53% of the steam produced in the system is recycled back to the reformer in the mixed feed. The normalized gross specific energy is about 16% greater than the normalized net specific energy. Without credit for the export steam, the specific energy is increased by about 16%.

Example 2

Figure 3:
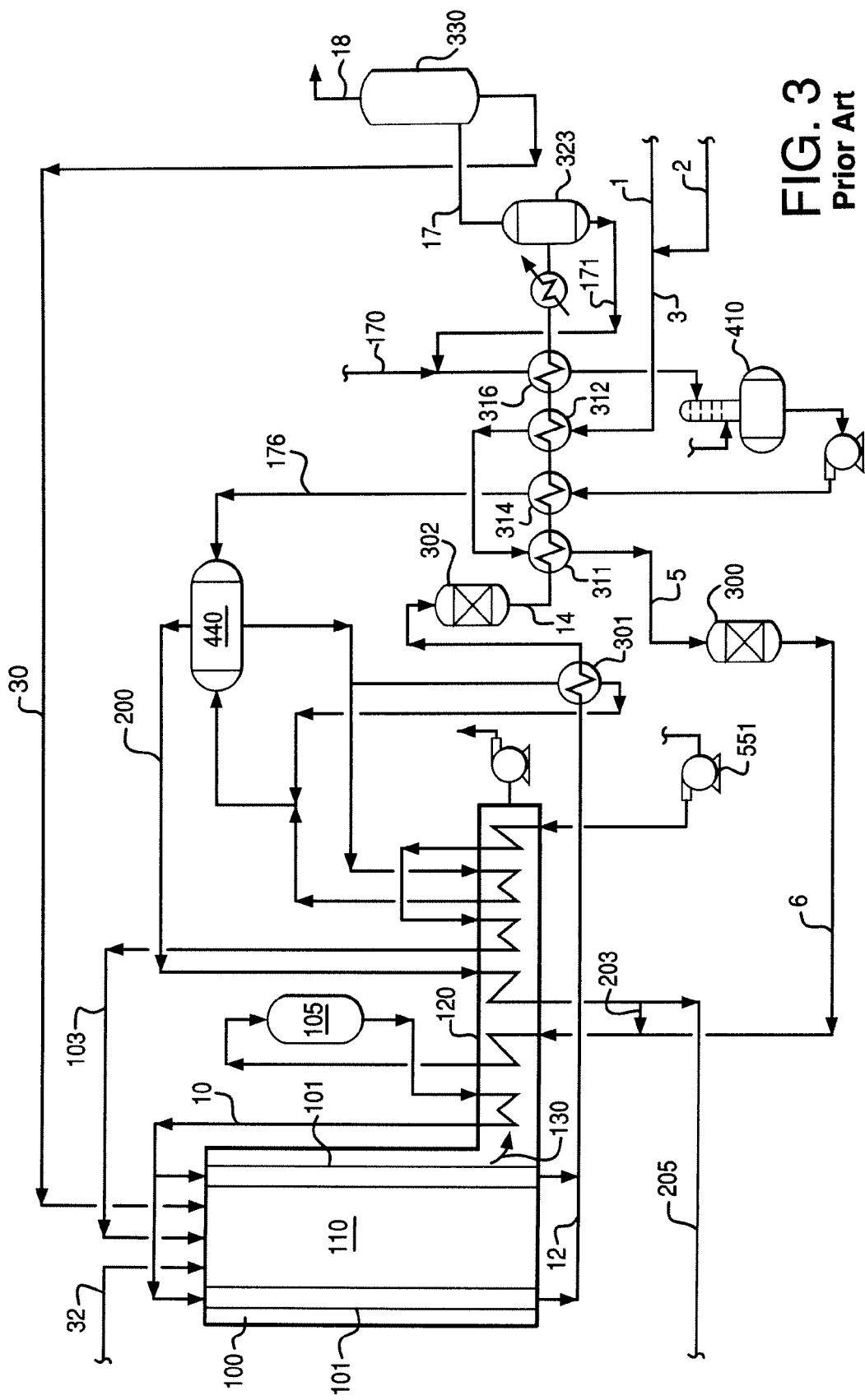
FIG. 3 is a process flow diagram exemplifying a prior art-type production facility for generating hydrogen and generating export steam, which includes a performer and high temperature shift reactor.

The configuration according to Example 2 is shown in FIG. 3. FIG. 3 is a process flow diagram for a prior art-type hydrogen production facility that includes a performer. With the exception of the adiabatic performer 105 and some heat exchangers, the configuration according to Example 2 is the same as the configuration according to Example 1 in FIG. 2. Where there are like elements in FIG. 2 and FIG. 3, like reference numbers are used.

A difference is that reformer feed gas mixture stream 10 is formed from feed steam stream 203 and sulfur-depleted reformer feedstock 6 by mixing followed by indirect heat exchange with combustion product gases in the convection section 120 of the reformer 100, prereforming in performer 105 and heating again in the convection section 120. Otherwise, the description of the configuration provided for Example 1 applies mutatis mutandis to the configuration of Example 2.

The process according to Example 2 was modeled using commercial process simulator software.

Input parameters and results for this configuration are summarized in Table 1.

As shown in Table 1, according to the simulation results, about 67% of the steam produced in the system is recycled back to the reformer in the mixed feed. These results show that a greater percentage of steam produced in the process is used by the process in the reformer. Alternatively stated, less steam is exported when a performer is used.

The normalized net specific energy is decreased about 0.3% compared to the net specific energy of Example 1. It means that the configuration in Example 2 is slightly better than the configuration of Example 1 since less energy is required to produce a specified amount of hydrogen. The gross specific energy for Example 2 is 7% greater than the net specific energy of Example 1. Without credit for the export steam, the specific energy is increased by about 7% over net specific energy for Example 1. This is a significant improvement over the gross specific energy of Example 1.

Example 3

Figure 4:
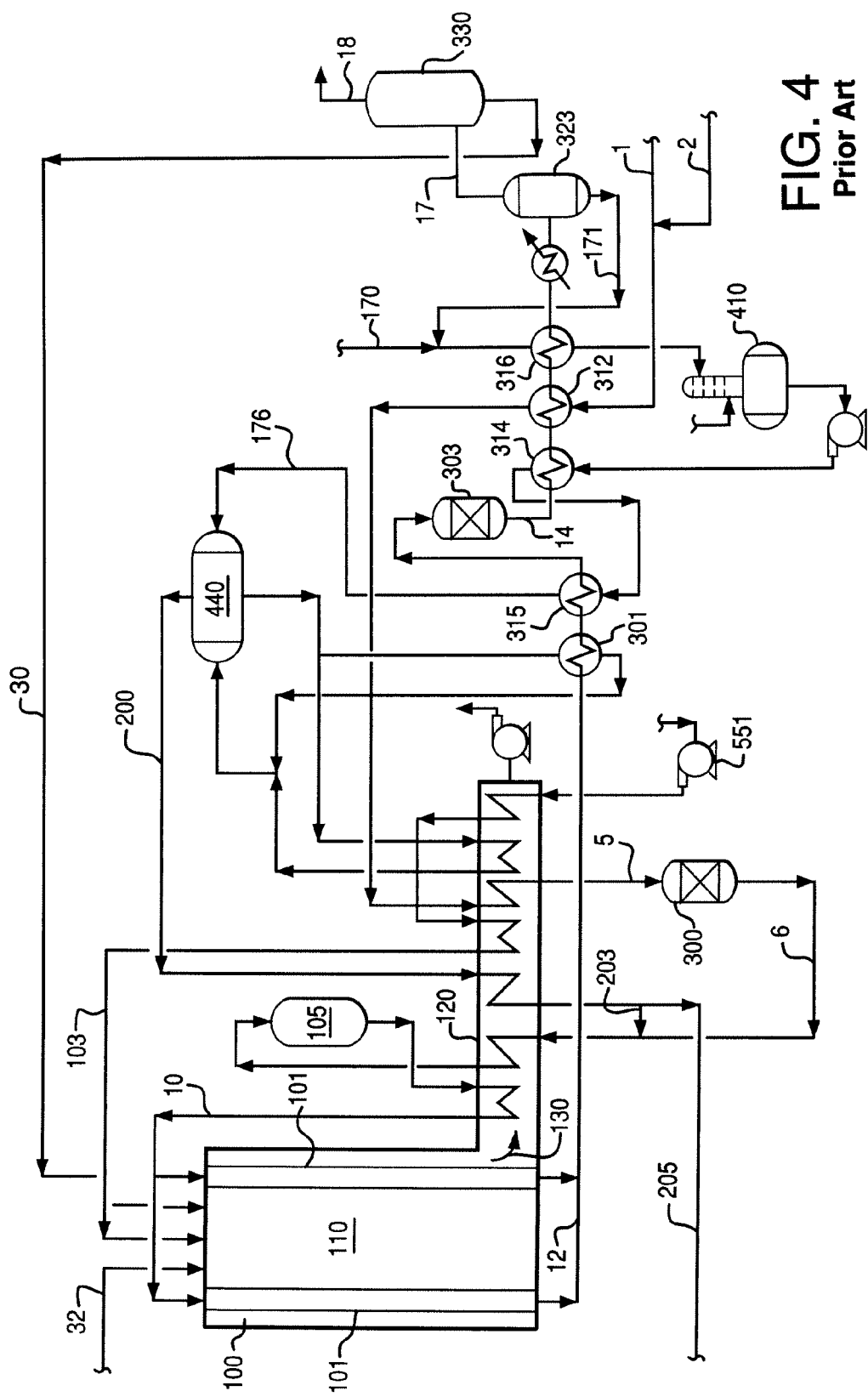
FIG. 4 is a process flow diagram exemplifying a prior art-type production facility for generating hydrogen and generating export steam which includes a performer and a medium temperature shift reactor.

The configuration according to Example 3 is shown in FIG. 4. FIG. 4 is a process flow diagram for a prior art-type hydrogen production facility that includes a performer. In this configuration a medium temperature shift reactor 303 is used in place of a high temperature shift reactor. Some of the heat recovery has been modified accordingly. Otherwise, the configuration of Example 3 is very similar to the configuration of Example 2. Where there are like elements in FIGS. 2, 3 and 4, like reference numbers are used.

The description of the configuration provided for Examples 1 and 2 apply mutatis mutandis to the configuration of Example 3. Differences will be apparent to one skilled in the art based on the process flow diagram.

The process according to Example 3 was modeled using commercial process simulator software.

Input parameters and results for this configuration are summarized in Table 1.

As shown in Table 1, according to the simulation results, about 64% of the steam produced in the system is recycled back to the reformer in the mixed feed. These results show that a greater percentage of steam produced in the process is used by the process in the reformer as compared to Example 1, but slightly less steam than in Example 2.

The normalized net specific energy is decreased about 1.5% compared to the net specific energy of Example 1. It means that by using a medium temperature shift reactor as in Example 3 instead of a high temperature shift reactor as in the configuration of Example 1, less energy is required to produce a specified amount of hydrogen. The gross specific energy for Example 3 is 8% greater than the net specific energy of Example 1. Without credit for the export steam, the specific energy is increased by about 8% over net specific energy for Example 1. This is a significant improvement over the gross specific energy of Example 1.

Example 4

Figure 5:
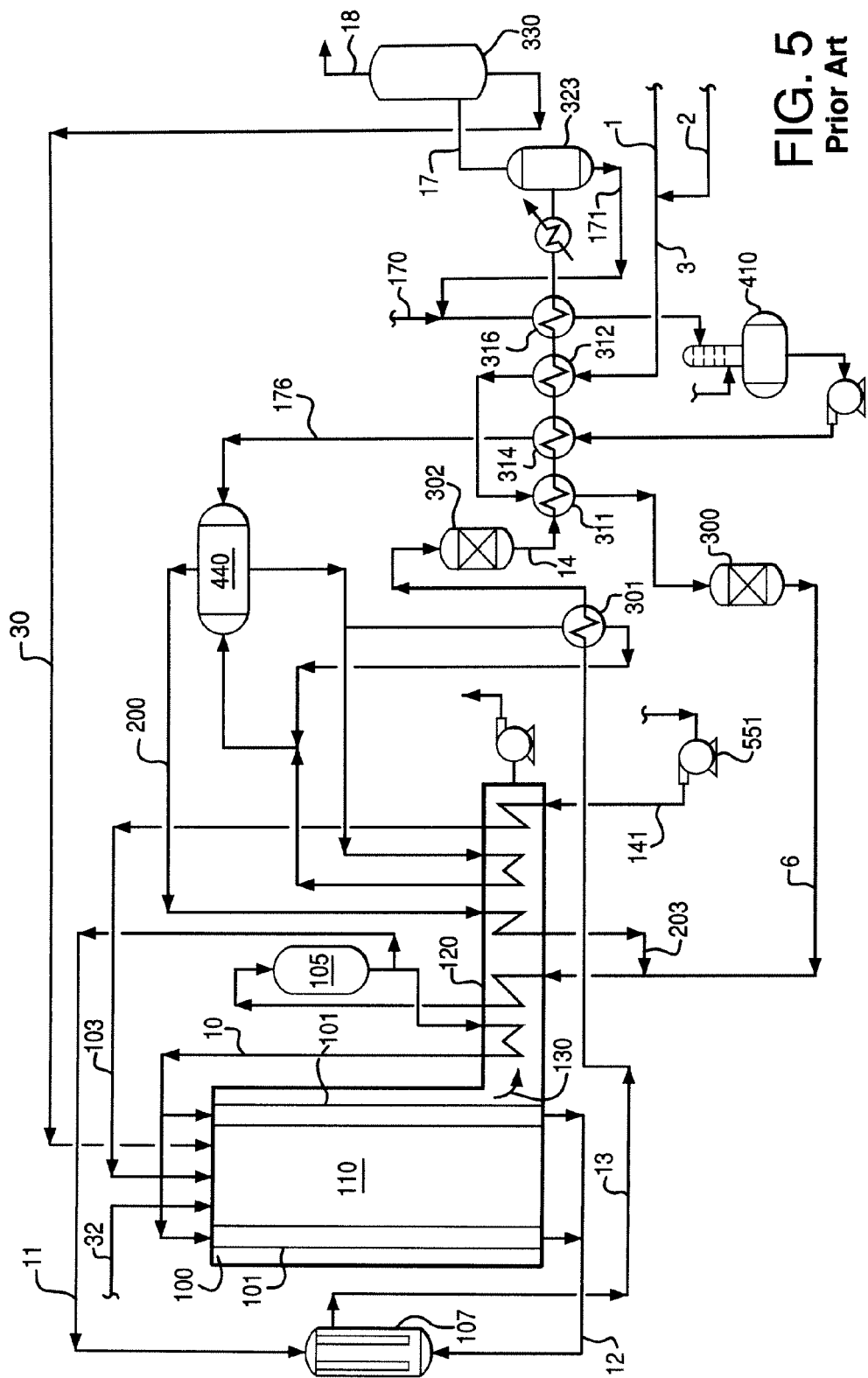
FIG. 5 is a process flow diagram exemplifying a prior art-type production facility for generating hydrogen, which includes an adiabatic performer, a high temperature shift reactor and a heat transfer reformer.

The configuration according to Example 4 is shown in FIG. 5. FIG. 5 is a process flow diagram for a prior art-type hydrogen production facility that includes a performer and a convective heat transfer reformer 107. A convective heat transfer reformer is described in U.S. Pat. No. 5,264,202. As shown in this example, a convective heat transfer reformer may be used to minimize or eliminate steam export. However, a problem is that a larger capital investment is required for the convective heat transfer reformer and/or a retrofit of an existing production facility is difficult.

The configuration according to Example 4 is similar to the configuration according to Example 2 in FIG. 3. Where there are like elements in FIG. 3 and FIG. 5, like reference numbers are used.

A difference is that effluent from the performer 105 is divided into reformer feed gas mixture stream 10 and convective heat transfer reformer feed stream 11. Convective heat transfer reformer feed stream 11 is introduced into reformer tubes in the convective heat transfer reformer 107. A stream comprising the reformed gas mixture 12 is introduced into convective heat transfer reformer 107 to provide heat for reforming the feed stream 11. An effluent stream 13 formed from the reformed gas mixture 12 and a mixture formed from reforming the feed stream 11 is withdrawn from the convective heat transfer reformer 107. Effluent stream 13 is passed through boiler 301, high temperature shift reactor 302 and various other heat exchangers downstream of the shift reactor 302.

Otherwise, the description of the configuration provided for Example 1 applies mutatis mutandis to the configuration of Example 4.

Input parameters and results for this configuration are summarized in Table 1.

The process according to Example 4 was modeled using commercial process simulator software.

As shown in Table 1, according to the simulation results, all of the steam produced in the system is recycled back to the reformer in the mixed feed. No steam is exported.

The normalized net specific energy is increased about 2.3% compared to the net specific energy of Example 1. It means that the configuration in Example 4 is slightly worse than the configuration of Example 1 since more energy is required to produce a specified amount of hydrogen. However, if no credit for export steam can be given, the configuration of Example 4 looks more attractive, since the penalty is only 2.3% compared to 16% for Example 1. The gross specific energy for Example 4 is 2.3% greater than the net specific energy of Example 1, while the gross specific energy for Example 1 is 16% greater than the net specific energy of Example 1.

Example 5

Figure 6:
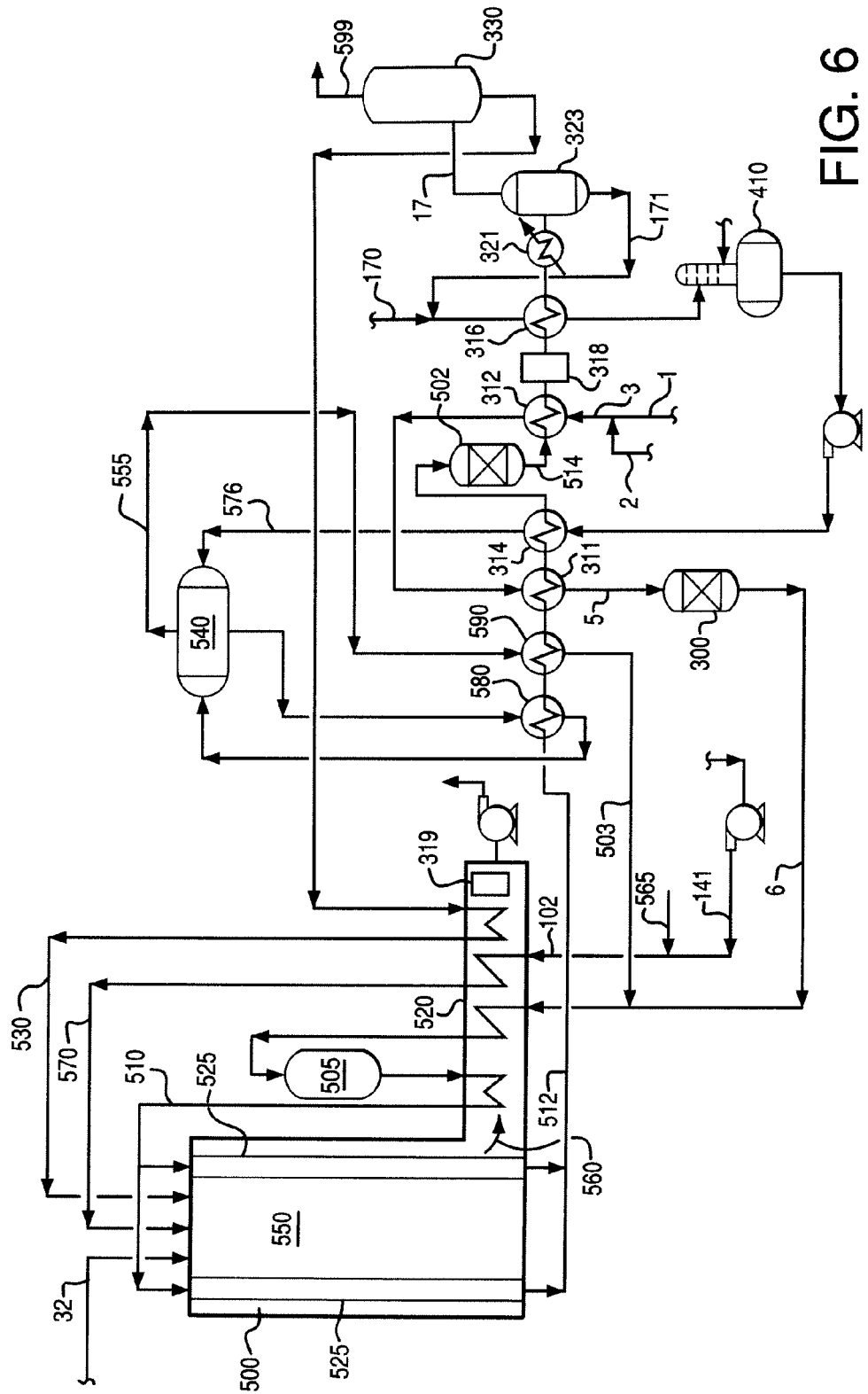
FIG. 6 is a process flow diagram exemplifying a production facility for generating hydrogen according to the present method.

The configuration according to Example 5 is shown in FIG. 6. FIG. 6 is a process flow diagram for a hydrogen production facility exemplifying the invention.

A reformer feedstock 1, in this example, natural gas is mixed with a hydrogen recycle stream 2 to form a hydrogen-containing feed stream 3. The hydrogen-containing feed stream 3 is heated via indirect heat exchange with a shift reactor effluent stream 514 from shift reactor 502 in heat exchangers 311 and 312. The shift reactor effluent stream 514 is formed from a reformed gas mixture 512 from the reformer 500 by reaction in shift reactor 502.

The heated hydrogen-containing feed stream 5 is introduced into hydrodesulphurization unit 300 to remove sulfur and form a sulfur-depleted reformer feedstock 6. Sulfur in the reformer feedstock is removed to prevent poisoning of reforming catalyst.

Reformer feed gas mixture stream 510 is formed from feed steam stream 503 and sulfur-depleted reformer feedstock 6 by mixing followed by indirect heat exchange with combustion product gases in the convection section 520 of the reformer 500, prereforming in performer 505 and heating again in the convection section 520. The reformer feed gas mixture stream 510 is introduced into a plurality of catalyst-containing reformer tubes 525 of the catalytic steam reformer 500 where hydrocarbons and steam are reacted in a reforming reaction to form synthesis gas. The synthesis gas is withdrawn from the plurality of catalyst-containing reformer tubes 525 as reformed gas mixture 512 comprising $H_2$. The reformed gas mixture may also comprise CO, $CO_2$, $CH_4$ and $H_2O$.

Heat for the reforming reaction is provided by combusting a fuel and air in the combustion section 550 of the reformer 500.

Fuel is provided by pressure swing adsorber (PSA) residual gas 530, which heated by indirect heat exchange in the convection section 520 and then introduced into the combustion section 550. Fuel for combustion is also provided by a supplemental fuel 32, which is introduced into the combustion section 550 and in this example the supplemental fuel is natural gas.

Preheated oxygen-enriched air 570 is introduced into the combustion section 550. Preheated oxygen-enriched air 570 is formed by mixing an industrial gas grade oxygen stream 565 with compressed air stream 141 followed by heating in convection section 520. The $O_2$ to $N_2$ molar ratio in this example is 0.67, which corresponds to an oxygen concentration of about 40 mole % oxygen. The $O_2$ to $N_2$ molar ratio can be varied to effect the desired molar ratio of steam used for reforming to the total steam produced, $S/S_T$.

A combustion product gas mixture 560 is withdrawn from the combustion section 550 and used to heat various streams in convection section 520 by indirect heat exchange.

In the process flow diagram in FIG. 6, steam is generated by indirect heat exchange between water and a stream formed from reformed gas mixture 512. Make-up water 170 and water 171 from water separator 323 are heated and fed to deaerator 410. Water 576 which has been preheated and deaerated, is fed into a into a steam drum 540. The steam drum is typically elevated. Water from the steam drum 540 is directed to heat exchanger 580 which provides indirect heat exchange between the water and the reformed gas mixture 512. A two-phase mixture of steam and water flows from heat exchanger 580 back to the steam drum 540. A saturated stream of steam 555 is withdrawn from the steam drum 540 while liquid water is recirculated to the heat exchanger to form more steam. The saturated stream of steam 555 is superheated in another heat exchanger 590 which provides indirect heat exchange between the saturated steam and a stream comprising reformed gas mixture. The superheated steam is used to replenish the feed steam stream 503 in this example without forming export steam.

The reformed gas mixture 512 is passed through heat exchangers 311 and 314 and then through medium temperature shift reactor 502 to form shift reactor effluent 514. The shift reactor effluent is passed through various heat exchangers 312, 316, 321, low pressure boiler 318, water separator 323 and to a pressure swing adsorber 330. Water is removed as stream 171 and a hydrogen containing stream 17 is passed to the pressure swing adsorber system 330. Pressure swing adsorber system 330 separates the hydrogen from the other components in the shifted reformed gas mixture to form a product hydrogen stream 599 and a PSA residual gas 530.

Since the pressure of this low pressure stream does not have a pressure of 2 to 12 MPa, this steam is not counted in $R_2$ or $S_T$.

The process shown in the process flow diagram in FIG. 6 excluding steam generation in heat exchanger 319, was modeled using commercial process simulator software.

Input parameters and results for this configuration are summarized in Table 1. Input parameters include the steam-to-carbon ratio, S/C, and the effective or overall oxygen to nitrogen molar ratio for oxidants introduced into the combustion section, $O_2/N_2$. The results include the ratio of steam used for reforming to the total steam produced, $S/S_T$, and the net and gross specific energy.

As shown in Table 1, according to the simulation results, all of the steam produced in the system is recycled back to the reformer in the reformer feed gas mixture. No steam is exported in this example.

The normalized net specific energy is decreased about 2.5% compared to the net specific energy of Example 1. The specific energy consumption is less than the specific energy consumption in Example 1 even when credit is given for export steam.

Since the process according to Example 5 produces no export steam, the gross specific energy and the net specific energy are the same. The results show that the gross specific energy for the method in Example 5 is lower than the gross specific energy of Examples 1-3. This is important for cases where there is little or no need for export steam.

Although the present invention has been described as to specific embodiments or examples, it is not limited thereto, but may be changed or modified into any of various other forms without departing from the scope of the invention as defined in the accompanying claims.

TABLE 1

|  | Example 1 | Example 2 | Example 3 | Example 4 | Example 5 |
|---|---|---|---|---|---|
| S/C | 3 | 3 | 2.5 | 3 | 2.5 |
| $O_2/N_2$ | 0.27 | 0.27 | 0.27 | 0.27 | 0.67 |
| $S/S_T$ | 0.53 | 0.67 | 0.64 | 1 | 1 |
| Net Specific Energy | 100 | 99.7 | 98.5 | 102.3 | 97.5 |
| Gross Specific Energy | 116.1 | 107 | 108.1 | 102.3 | 97.5 |

We claim:

1. A method for generating hydrogen in a production facility comprising:

forming a reformer feed gas mixture stream from a feed steam stream and a reformer feedstock stream comprising a hydrocarbon wherein the feed steam stream has a first steam mass flow rate, $R_1$;

introducing the reformer feed gas mixture stream into a plurality of catalyst-containing reformer tubes of a catalytic steam reformer and reacting the hydrocarbon with the steam in a reforming reaction under reaction conditions effective to form a reformed gas mixture comprising hydrogen;

introducing a fuel into a combustion section of the reformer;

introducing oxygen and nitrogen into the combustion section of the reformer at an $O_2$ to $N_2$ molar ratio of 0.35 to 2.3;

combusting the fuel with the oxygen in the combustion section under conditions effective to combust the fuel to form a combustion product gas mixture and generate heat to supply energy for the reforming reaction;

withdrawing the combustion product gas mixture from the combustion section of the reformer;

withdrawing the reformed gas mixture from the plurality of catalyst-containing reformer tubes; and generating an intermediate gas stream comprising steam from a liquid water-containing stream via indirect heat exchange between the liquid water-containing stream and at least one of a stream formed from the reformed gas mixture and a stream formed from the combustion product gas mixture, the intermediate gas stream comprising steam having a pressure of 2 MPa to 12 MPa and having a second steam mass flow rate, $R_2$, wherein $$0.9 \leq \frac{R_2}{R_1} \leq 1.2.$$

2. The method of claim 1 wherein $$0.9 \leq \frac{R_2}{R_1} \leq 1.1.$$

3. The method of claim 1 wherein 90% to 100% of the second steam mass flow rate, $R_2$, is generated via indirect heat exchange between the liquid water-containing stream and the stream formed from the reformed gas mixture.

4. The method of claim 1 wherein 0 to 10% of the second steam mass flow rate, $R_2$, is generated via indirect heat exchange between the liquid water-containing stream and the stream formed from the combustion product gas mixture.

5. The method of claim 1 wherein $R_2 = R_1$ and wherein 100% of the second steam mass flow rate, $R_2$, is generated via indirect heat exchange between the liquid water-containing stream and the stream containing the reformed gas mixture and wherein 0% of the second steam mass flow rate, $R_2$, is generated via indirect heat exchange between the liquid water-containing stream and the stream containing the combustion product gases.

6. The method of claim 1 further comprising:

replenishing the feed steam stream from a stream formed from at least a portion of the intermediate gas stream comprising steam.

7. The method of claim 1 wherein the fuel has a hydrogen concentration of 0 to 40 mole %.

8. The method of claim 1 wherein the oxygen and nitrogen are introduced together as an oxygen-enriched oxidant mixture.

9. The method of claim 1 wherein a first portion of the oxygen introduced into the combustion section is introduced as a first oxidant mixture having a concentration of 20 mole % to 26 mole % oxygen and a second portion of the oxygen introduced into the combustion section is introduced as a second oxidant mixture having a concentration of 26 mole % to 100 mole % oxygen.

10. The method of claim 1 further comprising:
superheating at least a portion of the intermediate gas stream via indirect heat exchange between the intermediate gas stream and at least a portion of the stream formed from the reformed gas mixture or another stream formed from the reformed gas mixture thereby forming a superheated intermediate gas stream; and
replenishing the feed steam stream from a stream formed from at least a portion of the superheated intermediate gas stream.

11. The method of claim 10 wherein the superheated intermediate gas stream is superheated by 40° C. to 175° C.

12. The method of claim 1 further comprising:
superheating at least a portion of the intermediate gas stream via indirect heat exchange between the intermediate gas stream and at least a portion of the stream formed from the combustion product gas mixture or another stream formed from the combustion product gas mixture thereby forming a superheated intermediate gas stream; and
replenishing the feed steam stream from at least a portion of the superheated intermediate gas stream.

13. The method of claim 12 wherein the superheated intermediate gas stream is superheated by 40° C. to 175° C.

14. The method of claim 1 wherein the intermediate gas stream comprising steam has a pressure of 2 MPa to 5 MPa.

15. The method of claim 1 further comprising:
introducing at least a portion of the stream formed from the reformed gas mixture with a temperature of 185° C. to 230° C. into a shift reactor containing copper oxide-based catalyst.

16. The method of claim 1 further comprising:
superheating the intermediate gas stream via indirect heat exchange between the intermediate gas stream and at least a portion of the stream formed from the reformed gas mixture or another stream formed from the reformed gas mixture thereby forming a superheated intermediate gas stream;
passing at least a portion of the superheated intermediate gas stream through a steam turbine to generate power and thereby forming a steam turbine effluent from the superheated intermediate gas stream; and
replenishing the feed steam stream from at least a portion of the steam turbine effluent.

17. The method of claim 16 further comprising:
using the power generated by the steam turbine for oxygen generation.

18. The method of claim 1 further comprising:
superheating the intermediate gas stream via indirect heat exchange between the intermediate gas stream and at least a portion of the stream formed from the reformed gas mixture or another stream formed from the reformed gas mixture thereby forming a superheated intermediate gas stream;
passing at least a portion of the superheated intermediate gas stream through a steam turbine to generate shaft work and thereby forming a steam turbine effluent from the superheated intermediate gas stream; and
replenishing the feed steam stream from at least a portion of the steam turbine effluent.

19. The method of claim 18 further comprising:
using the shaft work for oxygen generation.

20. The method of claim 1 further comprising:
generating a second intermediate gas stream comprising steam from a second liquid water-containing stream via indirect heat exchange between the second liquid water-containing stream and at least one of the stream formed from the reformed gas mixture, another stream formed from the reformed gas mixture, the stream formed from the combustion product gas mixture, and another stream formed from the combustion product gas mixture, the second intermediate gas stream comprising steam having a pressure of 130 kPa to 450 kPa; and
using the second intermediate gas stream as a heat source in a Rankine cycle heat engine to generate power, wherein the Rankine cycle heat engine has a working fluid.

21. The method of claim 20 wherein the working fluid is selected from the group consisting of propane, butane, pentane, ethylene, propylene, lithium bromide in water and mixtures thereof.

22. The method claim 1 wherein the oxygen and the nitrogen are introduced into the combustion section of the reformer at an $O_2$ to $N_2$ molar ratio of 0.6 to 0.8.

* * * * *